United States Patent
Inam et al.

(10) Patent No.: US 11,641,102 B2
(45) Date of Patent: May 2, 2023

(54) MODULAR FACTS DEVICES WITH EXTERNAL FAULT CURRENT PROTECTION WITHIN THE SAME IMPEDANCE INJECTION MODULE

(71) Applicant: Smart Wires Inc., Union City, CA (US)

(72) Inventors: Haroon Inam, San Jose, CA (US); Ali Farahani, Yorba Linda, CA (US); Amrit Iyer, Oakland, CA (US); Niloofar Torabi, Menlo Park, CA (US); Zbigniew Wolanski, Union City, CA (US); Guiping Zou, Union City, CA (US)

(73) Assignee: Smart Wires Inc., Durham, NC (US)

( * ) Notice: Subject to any disclaimer, the term of this patent is extended or adjusted under 35 U.S.C. 154(b) by 135 days.

(21) Appl. No.: 17/176,979

(22) Filed: Feb. 16, 2021

(65) Prior Publication Data

US 2021/0288489 A1    Sep. 16, 2021

Related U.S. Application Data

(60) Provisional application No. 62/987,515, filed on Mar. 10, 2020.

(51) Int. Cl.
| | | |
|---|---|---|
| *H02H 7/26* | (2006.01) | |
| *H02H 1/00* | (2006.01) | |
| *H02J 13/00* | (2006.01) | |
| *H02K 11/215* | (2016.01) | |
| *B25F 5/00* | (2006.01) | |
| *H02K 7/00* | (2006.01) | |
| *H02K 7/14* | (2006.01) | |
| *B25D 17/24* | (2006.01) | |

(52) U.S. Cl.
CPC ............... *H02H 7/26* (2013.01); *B25F 5/001* (2013.01); *H02H 1/0007* (2013.01); *H02K 7/003* (2013.01); *H02K 7/145* (2013.01); *H02K 11/215* (2016.01); *B25D 17/24* (2013.01); *B25D 2250/095* (2013.01); *H02J 13/00002* (2020.01)

(58) Field of Classification Search
CPC .......... H02H 3/162; H02H 7/16; H02H 9/041; H02H 1/0007; H02H 7/26; H02H 9/06; H02H 9/005; H02J 3/06; H02J 3/18; H02J 3/1807; Y02E 40/10; Y02E 40/30
See application file for complete search history.

(56) References Cited

U.S. PATENT DOCUMENTS

| | | | | |
|---|---|---|---|---|
| 10,666,038 | B2* | 5/2020 | Inam | ......................... H02J 3/06 |
| 11,309,701 | B2* | 4/2022 | Inam | ..................... H02J 3/1807 |

(Continued)

*Primary Examiner* — Jared Fureman
*Assistant Examiner* — Nicolas Bellido
(74) *Attorney, Agent, or Firm* — Womble Bond Dickinson (US) LLP

(57) ABSTRACT

An apparatus for injecting impedance into a high voltage (HV) transmission line is disclosed. The apparatus comprises a plurality of modular flexible alternating current transmission systems (FACTS) based impedance injection units (IIUs), each modular FACTS based IIU without fault current protection. The apparatus further comprises a fault current protection module external to the modular FACTS based IIUs. The fault current protection module is coupled to the modular FACTS based IIUs to provide fault current protection to the modular FACTS based IIUs.

21 Claims, 7 Drawing Sheets

(56) References Cited

U.S. PATENT DOCUMENTS

| | | | |
|---|---|---|---|
| 2017/0163245 A1* | 6/2017 | Iyer | H02J 3/26 |
| 2019/0006835 A1* | 1/2019 | Inam | H02H 9/041 |
| 2019/0237971 A1* | 8/2019 | Inam | H02J 3/20 |
| 2019/0260189 A1* | 8/2019 | Farahani | H02B 1/01 |
| 2020/0244062 A1* | 7/2020 | Inam | H02H 9/041 |
| 2020/0395756 A1* | 12/2020 | Harrington | G05B 19/042 |
| 2022/0158440 A1* | 5/2022 | Inam | H02J 3/06 |

* cited by examiner

MODULAR FACTS DEVICES WITH EXTERNAL FAULT CURRENT PROTECTION WITHIN THE SAME IMPEDANCE INJECTION MODULE

CROSS REFERENCE TO RELATED APPLICATIONS

This application claims the benefit of U.S. Provisional Application No. 62/987,815 filed on Mar. 10, 2020, the disclosure of which is incorporated herein by reference.

FIELD OF THE INVENTION

The present disclosure relates to systems and methods for flexible alternating current (AC) transmission systems (FACTS) and specifically to use of distributed power transmission and distribution control by static synchronous series compensators and other FACTS devices.

BACKGROUND

FACTS based distributed control of power transmission lines and connected distributed generation capabilities and loads have become very critical for improving the efficiency of a power grid. In a FACTS based system, power flow control devices vary in the type of services they can provide. Devices operate in either series or shunt modes and are highly complex and sophisticated pieces of machinery that require long planning cycles and preparation before installation.

Many of the FACTS devices use high voltage semiconductor-based power electronic converters to control the required parameters, such as line current, bus voltage, and more. Although converter-based FACTS devices provide a more granular and faster control than electro-mechanical devices, such as phase shifting transformers, the former have significant limitations in fault-handling capability. The cost and complexity of the fault-handling strategy and circuit design in a FACTS device is one of the significant limitations and is considered one of the main deterrents for large-scale adoption of the FACTS technology.

Furthermore, most FACTS devices today are custom-built for specific applications, and thus, no plug-and-play solution exists today. The lack of a solution is due to the unique design of the fault handling capability designed and implemented by individual suppliers of the FACTS systems and modules.

During a typical fault on the power grid, very high currents appear on the transmission lines of the grid. These fault conditions may be short lived, such as those due to a lightning strike, or they may be of a long duration, such as those due to ground shorts. Since the electronic components thyristor and IGBTs used in today's FACTS devices are prone to failure when such high currents are impressed on them, these conditions must be handled by a fault protection circuitry. The high, short-duration faults are generally diverted away from sensitive semi-conductor switches (e.g., IGBTs forming static synchronous series compensators (SSSCs), and thyristors forming thyristor controlled series compensators (TCSCs)) using fast acting, more robust switches such as SCRs, and metal oxide varistors (MOVs) to limit voltage rise. MOVs have a resistance value that reduces with the voltage applied across them. For longer duration faults, the protection is provided by electromechanical contactors and vacuum interrupters that can shut off the short circuit current.

FIG. 1 is a block diagram of a conventional power grid system having a TCSC or SSSC with breaker protections. In FIG. 1, power grid system 100 includes a TCSC or SSSC 104 that includes fault current protections as part of power grid system 100. Though only one switching device is shown in the representation of FACTS based TCSC or SSSC 104, it is not meant to be limiting. A multiplicity of FACTS devices may be connected in a series parallel combination to improve the current carrying capability of the TCSC or SSSC 104 used as an impedance injection module (TIM). The power grid system 100 comprises: a generator 101, a transformer 102 for stepping up the voltage for transmission over a high-voltage (HV) transmission line 105. A first circuit breaker (CB) 103 used to isolate the generator 101 from the transmission line 105 and any FACTS devices, such as TCSC or SSSC 104, in case of ground short or fault 108. A second circuit breaker 106 is used to isolate the power grid from load 107. During regular operation, a TCSC or SSSC 104 provides the capability for the line to be efficiently used for transfer of power over the HV transmission line 105.

The circuit breakers used on high voltage lines are mechanical switching devices which connect and break current circuits (operating currents and fault currents) and carry the nominal current in closed position. A typical circuit breaker is an automatically operated electrical switch designed to protect an electrical circuit from damage caused by an overload or a short circuit. Unlike a fuse, which operates once and then has to be replaced, a circuit breaker can be reset (either manually or automatically) to resume normal operation.

FIG. 2 is a diagram of a conventional SSSC. In FIG. 2, SSSC 200 includes fault protection circuitry that provides series capacitive compensation for the inductance of the power lines. As can be seen, the protection circuitry of SSSC 200 includes a capacitor 202 connected in series with a power line 201. SSSC 200 further includes an MOV bank 203 and a triggered gap 205, which may be a vacuum bottle, connected in series with an inductance 204 used to limit the current through the triggered gap 205, or in the case of longer time periods, a circuit or bypass breaker 206 (e.g., a bypass switch).

FIG. 3 is a diagram of a conventional TCSC. In FIG. 3, TCSC 300 can be TCSC 104 of FIG. 1. Referring to FIG. 3, TCSC 300 includes associated fault current protection circuitry. The circuitry includes an inverse-parallel pair of thyristors 307 with a recloser switch 306, and in combination with the inductor 305 (labelled as "L") connected in parallel with capacitor 304 (labelled as "C"), is able to inject capacitive and/or inductive impedances on power line 201 based on the firing of the thyristors, that is, the control being provided by a firing angle and duration. The protection circuitry also includes MOV 203 stack, triggered air/vacuum gap 205, and bypass breaker 206. The triggered air gap 205 and the bypass breaker 206 have a damping circuit 204 to reduce oscillations and provide a current limit. In addition to the fault current protection, TCSC 300 also includes circuit breakers 303A and 303B, which allow the TCSC 300 to be disconnected from line 201, and a re-closer breaker 302 for reconnecting the TCSC 300 when a fault is repaired. Though FIG. 3 shows a TCSC 300, the TCSC 300 can be replaced by a SSSC coupled to the HV transmission line or power line 201 using, for example, a transformer to provide similar results.

These conventional FACTS based power flow control modules show the FACTS based power flow control circuits that are used as IIMs, which are modules that provide power flow control over the HV transmission lines using impedance injection. These conventional FACTS based power flow control modules include fault protection capability associated with each of them. The fault protection capability makes these power flow control modules, used in large IIMs, expensive and unwieldy. It is therefore efficient to have the power flow control modules installed in substations. However, due to the high weight, volume and cost, these individual FACTS based power flow control modules have been found to be not usable in distributed control applications where a number of these FACTS based power flow control modules are needed to inject the needed impedance for power flow control.

BRIEF DESCRIPTION OF THE DRAWINGS

The drawings are made to point out and distinguish the invention from the prior art. The objects, features and advantages of the invention are detailed in the description taken together with the drawings.

DETAILED DESCRIPTION

Figure 1:
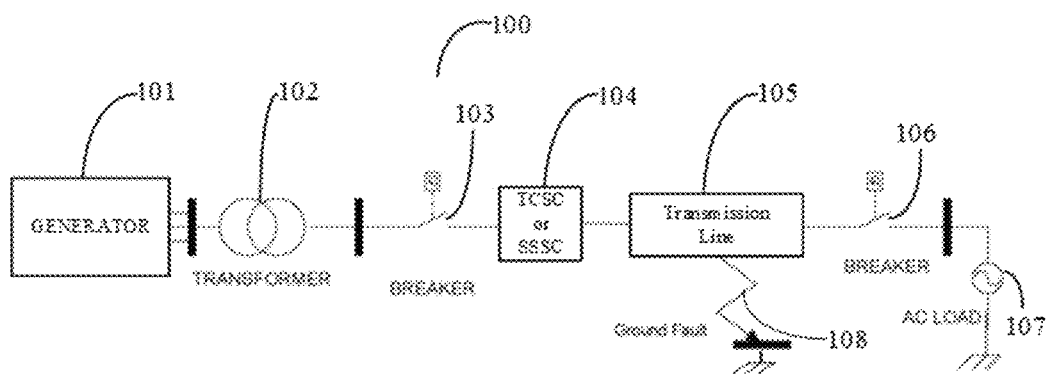
FIG. 1 is a block diagram of a conventional power grid system having a TCSC or SSSC with breaker protections.
Figure 2:
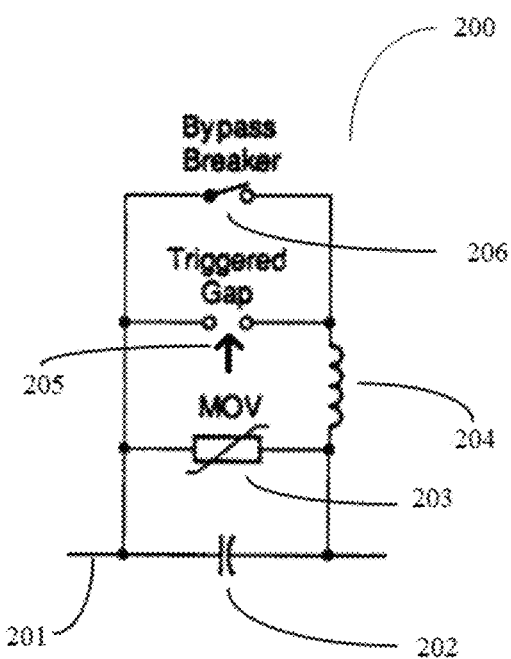
FIG. 2 is a diagram of a conventional SSSC.
Figure 3:
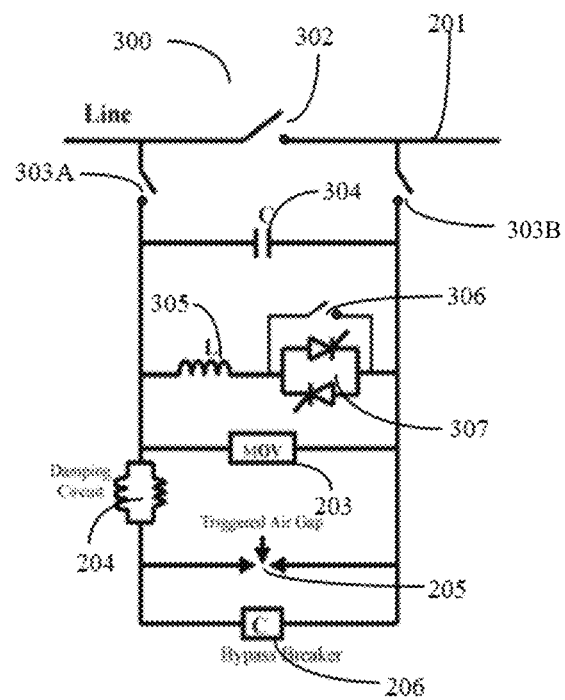
FIG. 3 is a diagram of a conventional TCSC.

Embodiments of the disclosure comprise an apparatus for use as a distributed impedance injection module, for injecting impedance into a high voltage (HV) transmission line. The apparatus comprises a plurality of modular flexible alternating current transmission systems (FACTS) based impedance injection units (IIUs), each modular FACTS based IIU without fault current protection. The apparatus further comprises a fault current protection module external to the modular FACTS based IIUs. The fault current protection module is coupled to the modular FACTS based IIUs to provide fault current protection to the modular FACTS based IIUs. The plurality of impedance injection units without built-in fault current protection and the fault current protection module coupled or connected in parallel to the plurality of IIUs forming a distributable impedance injection module that is configured to be attached or coupled to a high-voltage transmission and operate by extracting power from the HV transmission line.

Flexible AC transmission system (FACTS) enabling distributed control is a requirement for power transmission and distribution to improve line balancing and distribution efficiency. These FACTS devices are electronic circuits that vary in the type of services they provide. All FACTS devices currently have internal circuitry to handle fault currents. Most of these circuits are unique in design for each manufacturer, which make these FACTS devices non-modular, non-interchangeable, expensive and heavy. One of the most versatile FACTS device is the static synchronous series compensator (SSSC), which is used to inject impedance into the transmission lines to change the power flow characteristics. The current SSSCs in use comprise one or more FACTS based modules each with its own integrated fault current protection capability. The addition of integrated fault current handling circuitry makes the SSSC and similar FACTS devices unwieldy, heavy, and not a viable solution for distributed control. Embodiments of the disclosure disclosed herein are modifications to FACTS devices that move the fault current protection external to the FACTS device but provide the fault current protection for all FACTS base modules within each impedance injection module and make them modular, re-usable and standardized. Further by eliminating transformer coupling of the impedance injection modules to the HV power transmission lines, the weight of the FACTS based modules are further reduced. This enable distributed impedance injection modules (IIMs) to be distributed over the HV transmission lines for distributed power flow control and responding to disturbances sensed in any of the local control region where the IIMs are installed.

As can be seen, it will be ideal if the fault current handling capability can be removed from being associated with individual FACTS based units when making the IIMs and similar FACTS based control and protection systems for impedance injection on to a power transmission line. The fault current protection, in such cases, can be provided as a separate protection module, though it can still be implemented as part of the impedance injection module, which is an additional module within the distributed power flow control module. The individual FACTS modules and injection systems then become standard modular units capable of plug and play with a protection module associated with a plurality of impedance injection units forming the IIM. In addition, the modular FACTS devices are made lighter and smaller without the associated fault protection capability. A plurality of FACTS units can then be associated with a single fault protection unit to make an IIM, which is light enough to be useable in distributed applications on the grid.

The primary change to the FACTS devices is moving the unit-level fault protection module external to the FACTS device. This provides:

(1) Capability for standardization of the FACTS based modules and the fault current protection modules, thereby enabling them to be manufactured cheaper taking into account the volume based pricing of components.

(2) Substantial reduction in volume and weight of the FACTS devices, thereby allowing them to be used in distributed applications.

(3) Applications where a plurality of FACTS devices need to be configured and used as a group to make an IIM which can provide enough current carrying capacity and impedance injection capacity.

(4) In that regard, the reduction in volume allows heat generated within the FACTS devices to more readily dissipated.

(5) The system reliability is improved due to reduction in the number of modules/components used, that result in reducing the number of failure points or nodes within the implemented modules and sub-systems.

(6) The removal of custom FACTS units with custom short circuit protection capability enable IIMs to be built with a plurality of standard modules within a single containment module making manufacturing of the IIMs easier.

(7) By standardizing the size of FACTS based modules it becomes easier to provide for better impedance injection module design and provide for easier maintenance of the systems.

(8) The sizes of the standardized module enable the structure of the IIM, where the plurality of FACTS based modules and the fault current protection modules are to be assembled, tested and maintained, to be designed with the capability for ease of assembly and maintenance, such as by providing capability to slide the FACTS based modules and the fault current modules in and out of the TIM for easy access during repair work.

(9) The standardization further reduces the need for keeping large inventories of components, thereby reducing the cost of ownership of the distributed IIMs for the utility.

As is well understood in the industry, FACTS enabling distributed controls is a requirement for power transmission and distribution to improve line balancing and distribution efficiency, as well as respond to disturbances locally identified on the HV transmission lines. These FACTS devices are electronic circuits that vary in the type of services they provide. All FACTS devices have internal circuitry to handle fault currents. Most of these circuits are unique in design for each manufacturer, which make these FACTS devices non-modular, non-interchangeable, expensive and heavy. One of the most versatile FACTS device, the static synchronous series compensator (SSSC) for example, is used to inject impedance into the transmission lines to change the power flow characteristics. The addition of integrated fault current handling circuitry makes the SSSCs and similar FACTS devices unwieldy, heavier and not viable as a solution for distributed control. Disclosed herein are modifications to FACTS devices that move the fault current protection external to the FACTS device and make them modular and re-usable.

According to one aspect, an apparatus for injecting impedance into an HV transmission line is disclosed. The apparatus comprises a plurality of modular flexible alternating current transmission systems (FACTS) based impedance injection units (IIUs), each modular FACTS based IIU without fault current protection. The apparatus further comprises a fault current protection module external to the modular FACTS based IIUs. The fault current protection module is coupled to the modular FACTS based IIUs to provide fault current protection to the modular FACTS based IIUs.

According to another aspect, a power grid system is disclosed. The system comprises a plurality of impedance injection module distributed on a power transmission line. Each impedance injection module comprises a plurality of modular flexible alternating current transmission systems (FACTS) based impedance injection units (IIUs), and a fault current protection module external to the modular FACTS based IIUs. The fault current protection module is coupled to the modular FACTS based IIUs to provide fault current protection to the modular FACTS based IIUs.

According to another aspect, a power grid system is disclosed. The system comprises a plurality of impedance injection module distributed on a power transmission line. Each impedance injection module comprises a plurality of modular flexible alternating current transmission systems (FACTS) based impedance injection units (IIUs), and a fault current protection module external to the modular FACTS based IIUs within each IIM. The fault current protection module is coupled to the plurality of modular FACTS based IIUs within each impedance injection module to provide fault current protection to the modular FACTS based IIUs within each one of the impedance injection modules.

In one embodiment, the plurality of modular FACTS based IIUs comprises a first group of series-connected modular FACTS based IIUs and a second group of series-connected modular FACTS based IIUs interconnected in a series-parallel connection with the first group of series-connected modular FACTS based IIUs. The fault current protection module may be coupled in parallel with the first group of series-connected modular FACTS based IIUs and the second group of series-connected modular FACTS based IIUs. The apparatus may further comprise one or more pull out modules, with each pull out module including at least two parallel-connected modular FACTS based IIUs from the plurality of modular FACTS based IIUs. The one or more pull out modules may be series-connected with one another, and each pull out module may be individually disengageable or disconnectable.

In one embodiment, the fault current protection module is disposed at a top level of the apparatus and the one or more pull out modules are disposed at a bottom level of the apparatus. In one embodiment, the plurality of modular FACTS based IIUs may comprise static synchronous series compensators (SSSCs), thyristor controlled series compensators (TCSCs), or transformerless static synchronous series compensators (TL-SSSCs). In another embodiment, the plurality of modular FACTS based IIUs may comprise TL-SSSCs, with each TL-SSSC comprising a plurality of FACTS based switch units and a capacitor connected in parallel with the FACTS based switch units. Each FACTS based switch unit may comprise an insulated gate bipolar transistor (IGBT) and a switch control configured to control the IGBT based on an input control signal received from a control and communication module.

In one embodiment, the first group of series-connected modular FACTS based IIUs comprises four series-connected modular FACTS based IIUs, and the second group of series-connected modular FACTS based IIUs comprises four series-connected modular FACTS based IIUs. The fault current protection module may comprise a metal oxide varistor configured to handle surges and transients, a current limiting inductor, a triggered gap connected in series with the current limiting inductor, a bypass switch configured to handle short circuits and ground short conditions, with the bypass switching being connected in parallel with the triggered gap, and a recloser switch configured to isolate the plurality of modular FACTS based IIUs from the HV transmission line, with the recloser switch being connected in parallel with the metal oxide varistor.

According to another aspect, a power grid implementation with distributed control of power flow and distributed response to disturbance is described in the specification. The apparatus used for injecting impedance into a high voltage (HV) transmission line for control of power flow and providing corrective response to disturbances is detailed with one or more separate fault current protection modules that are connected in parallel with all the circuits of the impedance injection module. The apparatus comprises a plurality of modular flexible alternating current transmission systems (FACTS) based impedance injection units (IIUs), each modular FACTS based IIU without fault current protection. The apparatus further comprises a fault current protection module external to the modular FACTS based IIUs. The fault current protection module is coupled to the modular FACTS based IIUs to provide fault current protection to the modular FACTS based IIUs.

Some of the inventive and innovative ideas of the invention are further briefly described below. These are not meant to be a comprehensive listing but only as an example listing.

In a first example implementation an apparatus for injecting impedance into a high voltage (HV) transmission line of a power grid system, the apparatus being an impedance injection module (TIM) has one or more modular flexible alternating current transmission systems (FACTS) based impedance injection units (IIUs). The one or more modular FACTS based IIU are implemented without any fault current protection built-in. A fault current protection module is included within the apparatus, IIM, but it is external to the modular FACTS based IIUs. The fault current protection module is connected in parallel with and is coupled to the modular FACTS based IIUs to provide fault current protection to the modular FACTS based IIUs and other electronic circuits of the IIM apparatus.

The apparatus, TIM, are distributed over the power grid system with each IIM attached to a segment of the HV transmission line to provide distributed control capability locally at each segment of the HV transmission line for any identified power flow changes and disturbances. The apparatus, TIM is enabled with sufficient intelligence that include capabilities for sensing, determining and processing. The TIM is configured to sense and identify any power flow changes and disturbances over the HV transmission line. The fault current module within the IIM provides protection from fault current to the modular FACTS based IIUs and any other electronic circuits of the IIM. Each IIM attached to the segment of the HV transmission line operates by extracting power from the HV transmission line.

In an example of the apparatus, IIM the plurality of modular FACTS based IIUs have at least two groups of series-connected modular FACTS based IIUs. A first group of series-connected modular FACTS based IIUs and a second group of series-connected modular FACTS based IIUs are interconnected in a series-parallel connection with the first group of series-connected modular FACTS based IIUs, and a separate fault current protection module that is coupled in parallel with the series-parallel connected groups of modular FACTS based IIUs. These series-parallel connected groups of modular FACTS based IIUs and the fault current protection module connected in parallel, together form the IIM.

The apparatus is implemented in the TIM as a group of individually dis-engagable or dis-connectable pull-out modules. Each pull-out module includes in the example implementation at least two parallel-connected modular FACTS based IIUs and the pull out modules with the parallel-connected modular FACTS based IIUs in the pull out modules are connected in series, thereby connecting the modular FACTS based IIUs in a series-parallel configuration within the TIM. At least one fault current protection module is connected, coupled in parallel to the modular FACTS based IIUs in the IIM to provide protection to all the modular FACTS based IIUs in the IIM.

The modular FACTS based IIUs within each IIM may include any one or more of static synchronous series compensators (SSSCs), thyristor controlled series compensators (TCSCs), or transformerless static synchronous series compensators (TL-SSSCs).

In an example the transformer-less static synchronous series compensators (TL-SSSCs) are used as IIUs. Each IIU or TL-SSSC having at least four FACTS based switch units and at least capacitor connected in parallel with the FACTS based switch units. Each IIM, having one or more IIUs connected in series-parallel configuration, connected in series with the HV transmission line and carry the line current at the segment of the HV transmission line.

Each FACTS based switch unit includes at least an insulated gate bipolar transistor (IGBT) and a switch control configured to control the IGBT based on an input control signal received from a control and communication module.

The fault current protection module includes at least
a metal oxide varistor configured to handle surges and transients,
a current limiting inductor,
a triggered gap connected in series with the current limiting inductor,
a bypass switch configured to handle short circuits and ground short conditions, the bypass switching being connected in parallel with the triggered gap, and
a recloser switch configured to isolate the plurality of modular FACTS based IIUs from the HV transmission line. The recloser switch in the preferred implementation is connected in parallel with the metal oxide varistor.

The invention provides an example of a power grid system which has distributed control capability for power flow control and responding with corrective action to disturbances sensed on the power lines of the power grid. The exemplary system has a plurality of impedance injection modules distributed on a power transmission line, each impedance injection module is coupled in series on a segment of the power transmission line and operate by extracting power from the power transmission line. Each impedance injection module is enabled for monitoring and control of power flow and is also enabled to sense and respond to any disturbances locally on the segment (at the locality) of a power transmission line segment to which it is coupled.

Each impedance injection module is made up of modular flexible alternating current transmission systems (FACTS) based impedance injection units (IIUs). Each modular FACTS based IIU is without any fault current protection included within it. A separate fault current protection module is implemented in the IIM external to the modular FACTS based IIUs, where the fault current protection module is coupled in parallel across all the modular FACTS based IIUs in the IIM to provide fault current protection to all the modular FACTS based IIUs within the IIM.

Figure 4:
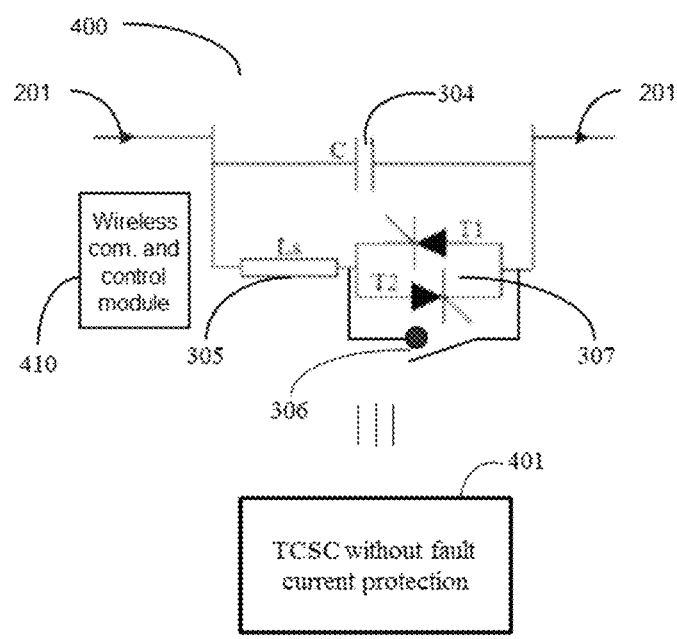
FIG. 4 is a block diagram of an example TCSC without fault current protection according to one embodiment.

FIG. 4 is a block diagram of an example TCSC without fault current protection according to one embodiment. Referring to FIG. 4, a TCSC module 400 is connected in series with an HV transmission line 201 (which may also be referred to as power line). As shown, a fault current protection circuit is not included (i.e., has been removed) in TCSC module 400. In one embodiment, module 400 comprises two branches in parallel, one branch being a capacitor 304

(labelled as 'C') and the second branch being an inductor 305 (labelled as 'L') in series with a thyristor switching unit 307 (e.g., inverse-parallel pair of thyristors). In one embodiment, a recloser switch 306 is connected in parallel with the thyristor switching unit 307 to shunt the switching unit 307 when reclosure is necessary. By controlling a firing frequency and firing angle of the thyristors in the thyristor switching unit 307, the TCSC module 400 can impress either an inductive or a capacitive impedance on the power line 201 to control the power flow on the power line 201. The control instructions and coordination of the TCSC 400 in distributed situations mandate coordinated action with other TCSC modules and any fault protection units external to the TCSC module 400. In one embodiment, a dedicated communication module 410 (which may be included in TCSC module 400) communicably links the TCSC module 400 to other FACTS modules, external fault protection units, and control and coordination facility. Similar communication modules are used with all TCSC modules, SSSC modules, TL-SSSC modules and FCPM modules (fault current protection modules), such as illustrated in some of the subsequent figures, though not shown therein so as to not obscure the points being illustrated. As further shown in FIG. 4, a representative block of the TCSC module 400 is shown as a TCSC block 401.

Figure 5:
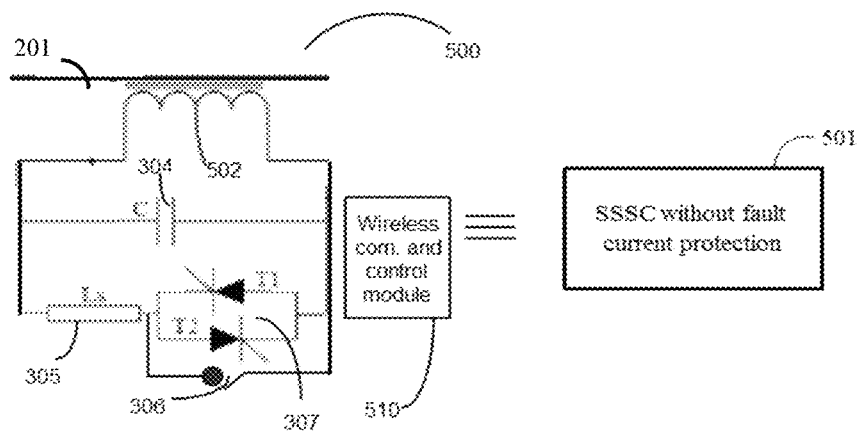
FIG. 5 is a block diagram of an example transformer coupled SSSC without fault current protection according to one embodiment.

FIG. 5 is a block diagram of an example transformer coupled SSSC without fault current protection according to one embodiment. Referring to FIG. 5, the fault protection circuitry is not included (i.e., has been removed) from static series synchronous controller (SSSC) module 500. In one embodiment, SSSC module 500 is shown as being coupled to the power line 201 by an injection transformer having a primary winding (not shown) in series with the power line 201 and a secondary winding 502. Similar to the TCSC module 400, the SSSC module 500 includes recloser switch 306 and thyristor switching unit 307 connected across the secondary winding 502 of the injection transformer as well as capacitor 304 in parallel as shown. As previously described, recloser switch 306 is connected in parallel with the thyristor switching unit 307 to shunt the switching unit 307 when reclosure is necessary. In one embodiment, module 500 comprises two branches in parallel, one branch being a capacitor 304 (labelled as 'C') and the second branch being an inductor 305 (labelled as 'L') in series with a thyristor switching unit 307 (e.g., inverse-parallel pair of thyristors). In one embodiment, a dedicated communication module 510 (which may be included in SSSC module 500) allows the SSSC module 500 to coordinate with other FACTS control devices, external fault protection units, and control and coordination facility in a manner similar to the TCSC module 400. As further shown in FIG. 5, SSSC 500 module can be represented as a SSSC block 501.

Figure 5A:
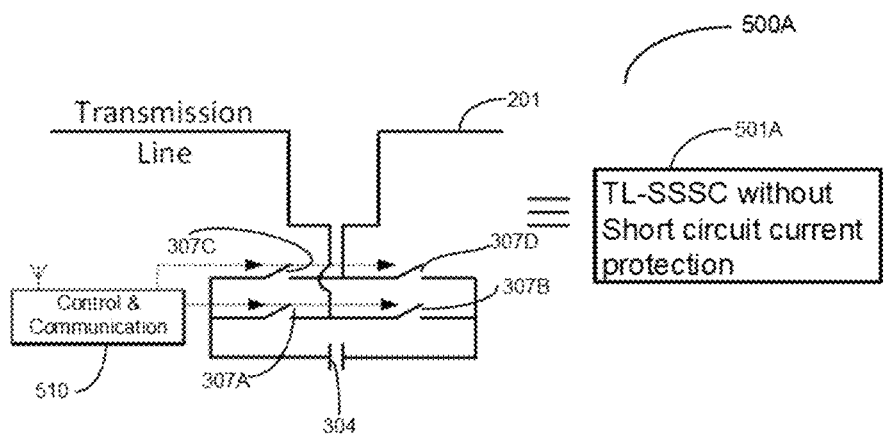
FIG. 5A is a block diagram of an example transformerless SSSC (TL-SSSC) without fault current protection according to one embodiment.

FIG. 5A is a block diagram of an example transformerless SSSC (TL-SSSC) without fault current protection according to one embodiment. Referring to FIG. 5A, the fault protection circuitry is not included (i.e., has been removed) in transformerless SSSC (TL-SSSC) 500A. In some embodiments, TL-SSSC 500A can be connected in series with the HV transmission line 201. As shown, in some embodiments, TL-SSSC 500A includes FACTS switches 307A-307D and capacitor 304, with the FACTS switches 307A-307D being connected in parallel with capacitor 304. Switches 307A and 307B (which can be connected in series with one another) can be disposed or connected in parallel with switches 307C and 307D (which also can be connected in series with one another). In one embodiment, a terminal between switches 307A and 307B may be connected to a first terminal (e.g., an input lead) of power line 201, and a terminal between switches 307C and 307D may be connected to a second terminal (e.g., an output lead) of power line 201. As further shown in FIG. 5A, TL-SSSC 500A can be represented as a TL-SSSC block 501A.

Figure 5B:
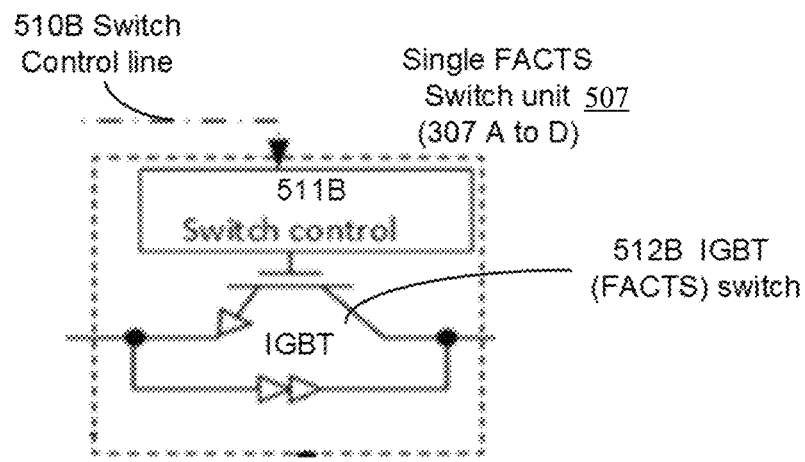
FIG. 5B is a block diagram of an example FACTS based HV-IIU switch unit according to one embodiment.

Referring now to FIG. 5B, which is a block diagram of an example FACTS based high voltage impedance injection unit (HV-IIU) switch unit, HV-IIU switch unit 507 of FIG. 5B may be each of the switches 307A-307D of FIG. 5A in some embodiments. FACTS based HV-IIU switch unit 507 may include an insulated gate bipolar transistor (IGBT) 512B, and a switch control 511B that is used to turn on or off the IGBT 512B in a controlled and synchronized fashion based on input control signals received from control and communication module 510 of FIG. 5A (which may be included in TL-SSSC 500A) to inject inductive or capacitive impedance on to the power line 201, that is, through the first and second terminals of power line 201. As shown, the input control signals may be communicated to switch control 511B through switch control line 510B.

It should be noted that by removing the associated fault current protection module from FACTS based TL-SSSC 501A, it is possible to have a number of TL-SSSCs 501A interconnected in a series-parallel connection when implementing them as an IIM 601A (described in more detail herein below). By paralleling a number of FACTS based switches or TL-SSSCs 501A as a group, the current carrying capability of the IIM 601A can be increased. Also, by connecting a number of these paralleled groups of TL-SSSCs 501A, the magnitude of impedance voltage injection can be increased. Using multiple groups of TL-SSSCS 501A in series also enables the injected impedance waveform to be adjusted to represent a pseudo sinusoidal waveform, thereby reducing the harmonics and other disturbances injected on to the power line 201.

Figure 6:
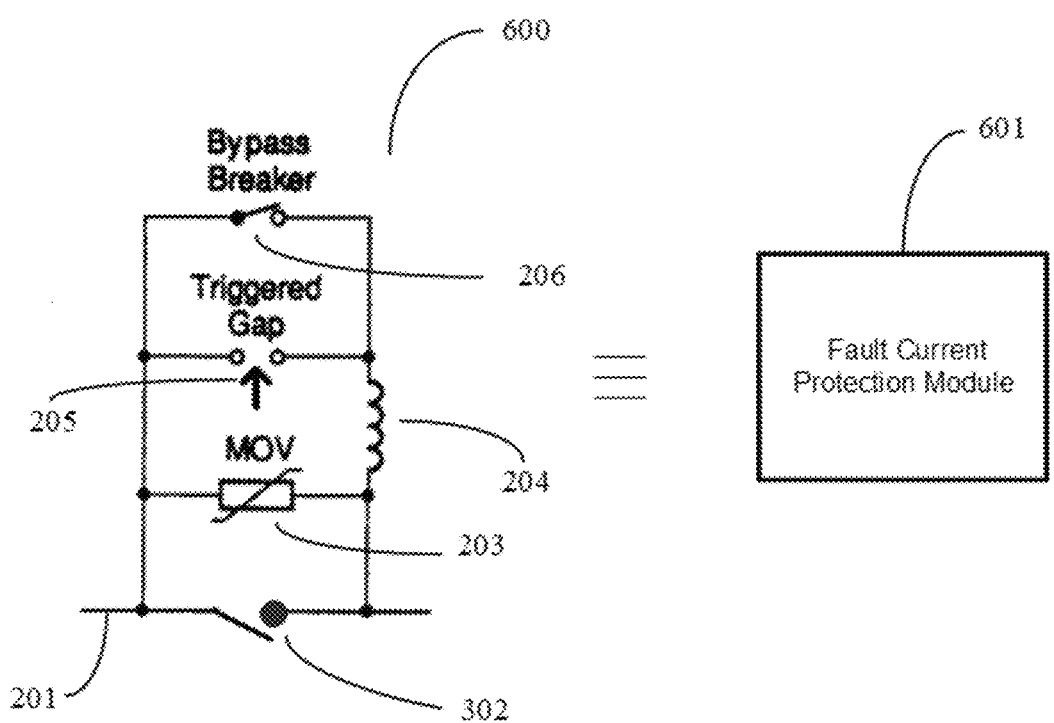
FIG. 6 is a block diagram of an example fault current protection module according to one embodiment.

FIG. 6 is a block diagram of an example fault current protection module (FCPM) according to one embodiment. Referring to FIG. 6, FCPM 600 is connected to power line 201 spanning the circuits to be protected. In one embodiment, FCPM 600 includes MOV 203 to handle surges and transients (short duration faults), a triggered gap 205 in series with a current limiting inductor 204 to handle longer lasting (medium duration) faults, and a bypass switch 206 to handle short circuits and ground short conditions (long duration faults). FCPM 600 further includes a recloser switch 302 to enable the system to be reset when the faults are removed. As shown, FCPM 600 can be represented as an external, separate FCPM block 601.

Figure 6A:
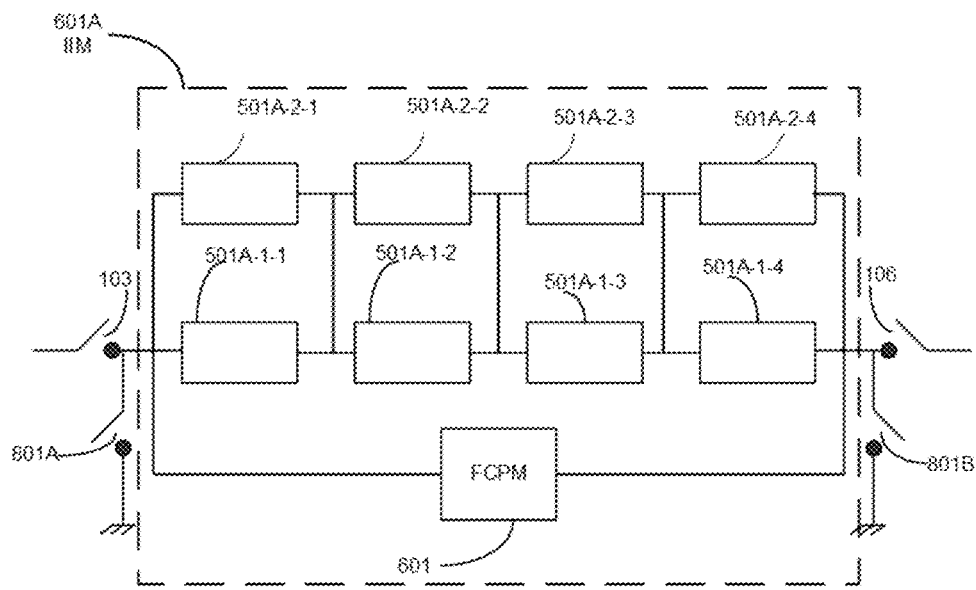
FIG. 6A is block diagram of an example standardized impedance injection module (IIM) having interconnected TL-SSSCs and a fault current protection module (FCPM) according to one embodiment.

Herein, having a number of TL-SSSCs 501A interconnected in a series-parallel combination with a FCPM 601 in parallel for fault current protection as a standardized IIM is disclosed. FIG. 6A shows such implementation of IIM 601A using, as an example, two groups of TL-SSSCs 501A connected in parallel with one another. In the example shown in FIG. 6A, a first group of TL-SSSCs 501A may include four series-connected TL-SSSCs (labelled as 501A-1-1 to 501A-1-4) and a second group of TL-SSSCs 501A may include four series-connected TL-SSSCs (labelled as 501A-2-1 to 501A-2-4), though any number of TL-SSSCs may be included in each group. That is, IIM 601A may include TL-SSSCs 501A-1-1 to 501A-1-4 and TL-SSSCs 501A-2-1 to 501A-2-4 that may represent a number of interconnected FACTS based IIUs. In FIG. 6A, TL-SSSCs 501A-1-1 to 501A-1-4 and TL-SSSCs 501A-2-1 to 501A-2-4 are interconnected in a series-parallel connection comprising two rows of four TL-SSSCs 501A with a fault current protection module 601 in parallel to the interconnected TL-SSSCs 501A-1-1 to 501A-1-4 and TL-SSSCs 501A-2-1 to 501A-2-4 to provide fault current protection forming the TIM 601A. TIM 601A are characterized by the lower weight, volume and cost and are suitable to be used as a number of distributed IIMs on the power line 201. IIM 601A can have its internal control and communication capability between the series-parallel connected FACTS based switching units in each TL-SSSC 501A and the parallel connected FCPM 601 within the TIM 601A implemented with high degree of reliability using optical fibers. Only the external communications to local intelligent centers (LINCs), to substations and to the distributed IIMs (e.g., IIM 601A) on other power line phases need to be implemented using secure wireless links. This allows the distributed IIMs that have intelligence built in to operate effectively even in the case of wireless communication failure to respond to changes in power flow recognized locally. It also allows the distributed IIMs to respond to local disturbances sensed on the power line 201 to which they are connected. It is noted that while TL-SSSCs 501A-1-1 to 501A-1-4 and TL-SSSCs 501A-2-1 to 501A-2-4 are utilized as IIUs in IIM 601A, other FACTS based IIUs can be used, such as TCSC 401 of FIG. 4 and SSSC 501 of FIG. 5.

In one embodiment, first circuit breaker (CB) 103 is used to isolate a generator (e.g., generator 101 of FIG. 1) from a power line (e.g., power line 201), TL-SSSC 501A-1-1 to 501A-1-4 and TL-SSSCs 501A-2-1 to 501A-2-4, and FCPM 601, in case of a ground short or fault. A second circuit breaker 106 may be used to isolate a power grid from a load (e.g., load 107 of FIG. 1). These circuit breakers are automatically operated electrical switches that are designed to protect the high voltage electrical circuits of the grid from damage caused by excess current from an overload or short circuit. They consist of multiple types classified based on the way the high current arcs that are formed are extinguished by the circuit breakers. Its basic function is to interrupt current flow after a fault is detected. Unlike a fuse, which operates once and then must be replaced, a circuit breaker can be reset to resume normal operation once the overcurrent condition is removed.

In some embodiments, a number of the standardized IIMs 601A may be further connected in series parallel combination for implementation in container based and substation based impedance injection applications for power flow correction on the power line 201 and responding to disturbances sensed on the power line 201 where they are installed.

In other embodiments, the FCPM 601 may be an independent external module. Such a module may be hung from a transmission line or supported by a separate support, such as a separate ground based or tower support, or as a further alternative, multiple FCPMs 601 as well as a group of IIMs 601A may be located in a substation, such as by way of example, a substation provided specifically for that purpose or on a mobile carrier for coupling to power lines where distributed IIMs 601A and establishment of substations are not currently feasible.

As discussed previously, in the past each manufacturer of the prior art FACTS device used to custom design an FCPM to suit their design requirements and manufacturing capabilities. By removing the non-standardized fault current protection devices from the FACTs based impedance injection units to make the new modular and standardized IIUs, these units that handle the desired impedance injection function are made available from all FACTS manufacturers. These standardized impedance injection units become much smaller in size, and lower in weight, by removal of the associated nonstandard fault current protection circuits.

Using the TL-SSSC 501A described herein, without the associated FCPM, makes the TL-SSSC 501A (and therefore, IIM 601A) light and more cost effective for distributed implementation over the power line 201. In one embodiment, having the external FCPM 601 separate from the modular TL-SSSC 501A makes arranging a number of these standardized, modular TL-SSSCs in parallel or in series with an external FCPM 601 module as part of IIM 601A to handle power transfer requirements of the power grid a much more elegant and efficient solution.

One of the challenges that arise, when a number of the FACTS based devices (e.g., FACTS switches 307A-307D of FIG. 5A) are connected to form one or more TL-SSSCs 501A, is the need for coordinating their operation to achieve the operational goals set by the utilities. High speed and secure inter module, group to group, and group to facility control is essential for proper operation of the inter linked TL-SSSCs and the parallel connected FCPM. Secure and dedicated communication techniques including optical pipes within TIM 601A, and line of sight wireless communication using, for example, 60 and 80 GHz bands or direct communication using lasers etc., are used for communication to sub-stations and IIMs 601A distributed on other phase power lines to achieve this coordination and control.

The challenge also extends to the operational integration requirement for control among the connected FACTS based IIUs (e.g., TL-SSSCs). This includes decision on which of the connected FACTS based IIUs should be active at any point in time and when the various protection devices should become active.

Figure 7:
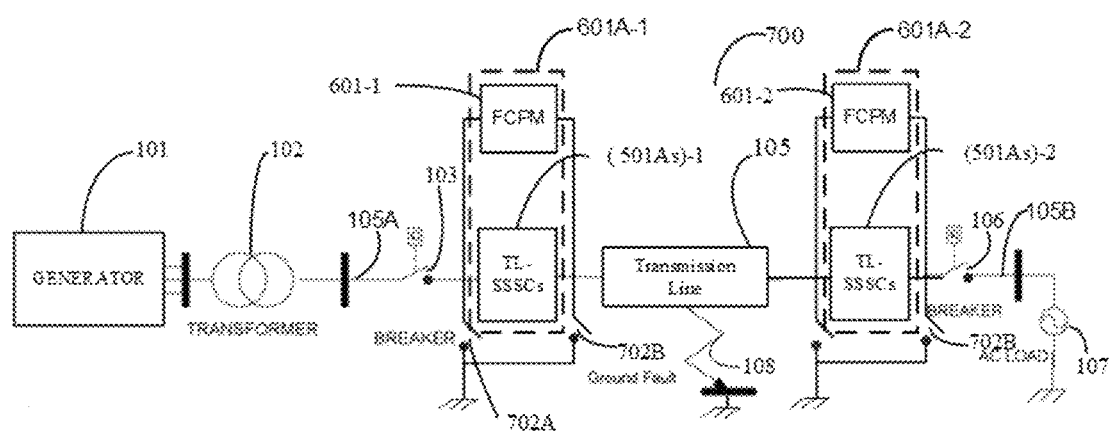
FIG. 7 is a block diagram of an example power grid system having TL-SSSCs and bypass and ground isolation protections according to one embodiment.

FIG. 7 is a block diagram of an example power grid system having TL-SSSCs and bypass and ground isolation protections according to one embodiment. In FIG. 7, power grid system 700 may include similar components as system 100 of FIG. 1, and for brevity sake, those components will not be described again herein. System 700 may further include IIM 601A-1 and IIM 601A-2 disposed in between breaker 103 and breaker 106. IIM 601A-1 may include FCPM 601-1 (which may be FCPM 601 of FIG. 6) and one or more TL-SSSCs 501A-1 (which may be TL-SSSC 501A of FIG. 5A) as IIUs. Similarly, IIM 601A-2 may include FCPM 601-2 and one or more TL-SSSCs 501A-2 as IIUs. It is noted that while TL-SSSCs 501A-1 and TL-SSSCs 501A-2 are utilized in IIM 601A-1 and IIM 601A-2, respectively as IIUs, other FACTS based IIUs can be used, such as TCSC 401 of FIG. 4

As shown, TL-SSSCs 501A-1 and a FCPM 601-1 are connected in parallel to one another providing protection to all TL-SSSCs 501A-1 (or other FACTS based IIUs) in IIM 601A-1, instead of a single prior art TCSC or SSSC unit 104 of FIG. 1 having the fault protection built in for itself. That is, in system 700, each TL-SSSC 501A-1 is protected by FCPM 601A-1. Similarly, TL-SSSCs 501A-2 and FCPM 601-2 are connected in parallel to one another to provide protection to all TL-SSSCs 501A-2 (or other FACTS based IIUs) in IIM 601A-2. That is, each TL-SSSC 501A-2 is protected by FCPM 601-2.

In some embodiments, organization of the groups with the capability to isolate the protected groups provide a big advantage to the serviceability of the power grid system 700. It is hence possible if a failure occurs in the FCPM 601 or any of the TL-SSSCs 501A of the IIM, to isolate the failed module/sub-module and replace the same with a similar module/sub-module or perform maintenance on the failed module by replacement of the failed part that is standardized and pre-tested. The selective removal and replacement enablement within an IIM 601A allow for power flow control and serviceability without major disruption to normal operations of the power system. This is hence fully enabled by the standardized modular replacement capability and standardization of the FACTS based IIUs, TL-SSSCs 501A and FCPM 601 used within the IIM 601A.

In various embodiments, removal of the fault current protection module from each FACTS based IIU (e.g., TCSC 401, SSSC 501, TL-SSSC 501A) has numerous advantages. Such FACTS based IIU reduces cost by eliminating unnecessary duplication of heavy circuitry, and the light weight of such FACTS device is advantageous when hung from a transmission line. It also reduces the volume (e.g., wind forces) and the cooling requirements of each FACTS device. It also allows and encourages standardization of the FACTS modules in performance and control, and similarly allows independent selection of a fault current protection module design for broad use, again standardizing their features, performance, communication and control requirements. Using a fault current protection module having a recloser switch, such as recloser switch 302 (FIG. 6), a protected group of FACTS based IIUs (e.g., TL-SSSCs 501A) that can be functionally isolated from the respective transmission line by closing the recloser switch to remove or divert transmission line current around that group of FACTS devices, may be useful even during normal operation, and particularly useful upon a failure or excess heating of a respective FACTS based IIUs in the TIM group.

In order to improve the maintainability a plurality of capabilities can be established in the IIM fame for the standardized FACTS based IIUs implemented as TL-SSSCs and the standardized FCPM within the TIM. They can include capability for each IIU and their sub-systems to be made easily accessible without trying to do any maintenance while within the IIM frame. One such capability is a pull out capability using a slide rail implementation that allow each of the component IIUs to be pulled out from the IIM. Such a system helps to make maintenance of the IIUs easier by making all the sides of the heavy IIUs easily accessible from outside the TIM when maintenance is to be conducted or replacement of sub-modules like capacitors or switches have to be done.

FIGS. 8A to 8D show an example implementation of FACTS based IIUs as removable modules within a frame forming an IIM having one or more FCPMs for providing fault current protection.

Figure 8A:
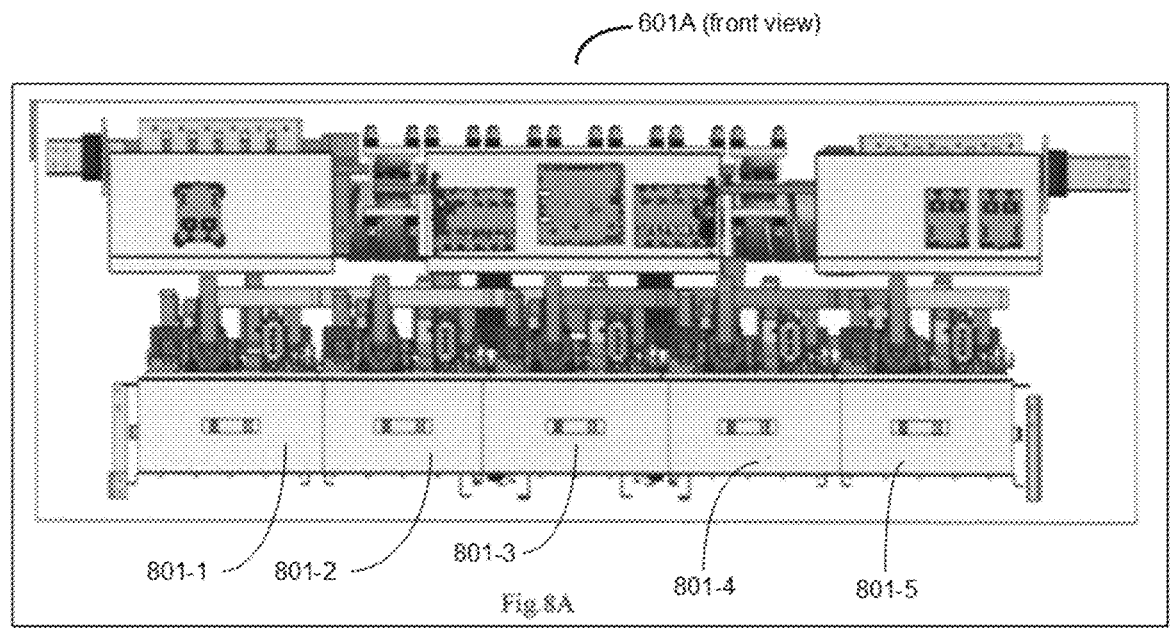
FIG. 8A is a front view diagram illustrating five series connected and individually disengageable pull out modules, each module having two parallel connected FACTS based IIUs deployed in an IIM within a frame, with fault current protection provided by one or more external fault current protection modules according to one embodiment.

FIG. 8A is a front view diagram illustrating five series connected and individually dis-engageable pull out modules. In FIG. 8A, IIM 601A may include a multiplicity of FACTS based IIUs (e.g., 10 TL-SSSCs 501A) interconnected as rows of parallel sets (e.g., two rows) capable of handling nominal AC power line currents (e.g. 1800A), where each FACTS based IIUs may be rated at 900A, for example. In one embodiment, IIM 601A may include series connected FACTS based IIUs (e.g., five TL-SSSCs 501A) providing for example a total of 3000 Volts peak injection capability on to power line 201.

With continued reference to FIG. 8A, IIM 601A may include pull out modules 801-1 to 801-5. Each of pull out modules 801-1 to 801-5 may include two parallel connected FACTS based IIUs (e.g., TCSCs 401, SSSCs, 501, or TL-SSSCs 501A), thereby having 10 FACTS based IIUs in total, though any number of FACTS based IIUs may be included in each pull out module in other embodiments. Modules 801-1 to 801-5 can be series connected and individually disengageable. Also, while five pull out modules 801-1 to 801-5 are illustrated, any number of pull out modules may be included in IIM 601A.

Figure 8B:
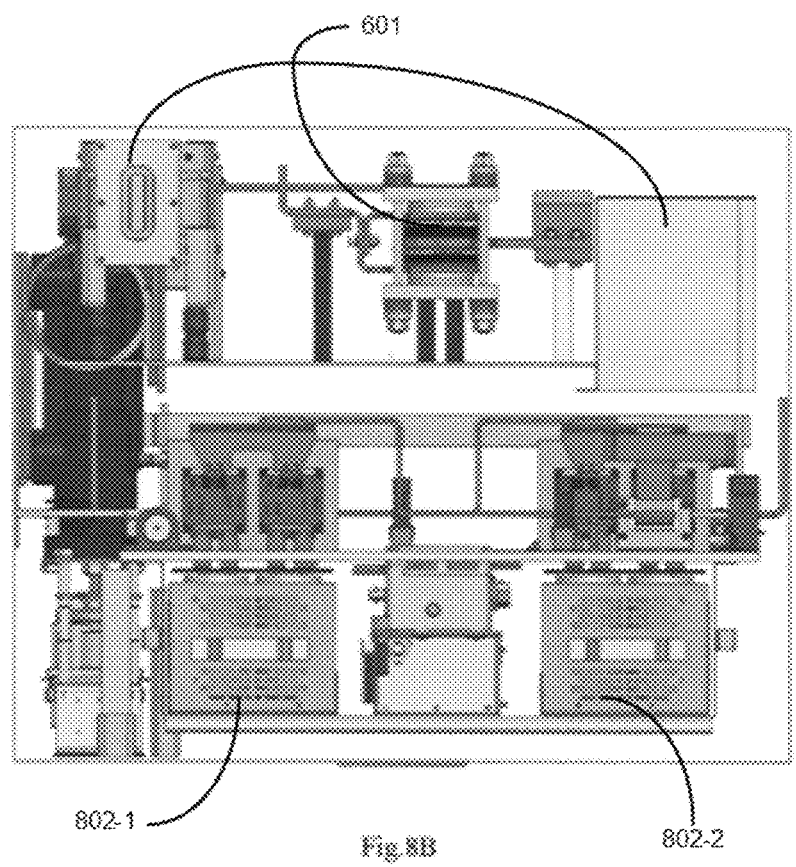
FIG. 8B is a side view diagram of the IIM having two parallel connected FACTS based IIUs and an FCPM according to one embodiment.

FIG. 8B is a side view diagram of the IIM illustrating two parallel connected FACTS based IIUs and an FCPM according to one embodiment. That is, FIG. 8B shows a side view of the IIM 601A shown in FIG. 8A having FCPM 601 separately disposed at a top level of IIM 601A. IIM 601A has two parallel connected FACTS based IIUs (e.g., TL-SSSCs 501A-1 and 501A-2) included in each of disconnectable and pull out modules 802-1 and 802-2 disposed at a bottom level of IIM 601A.

Figure 8C:
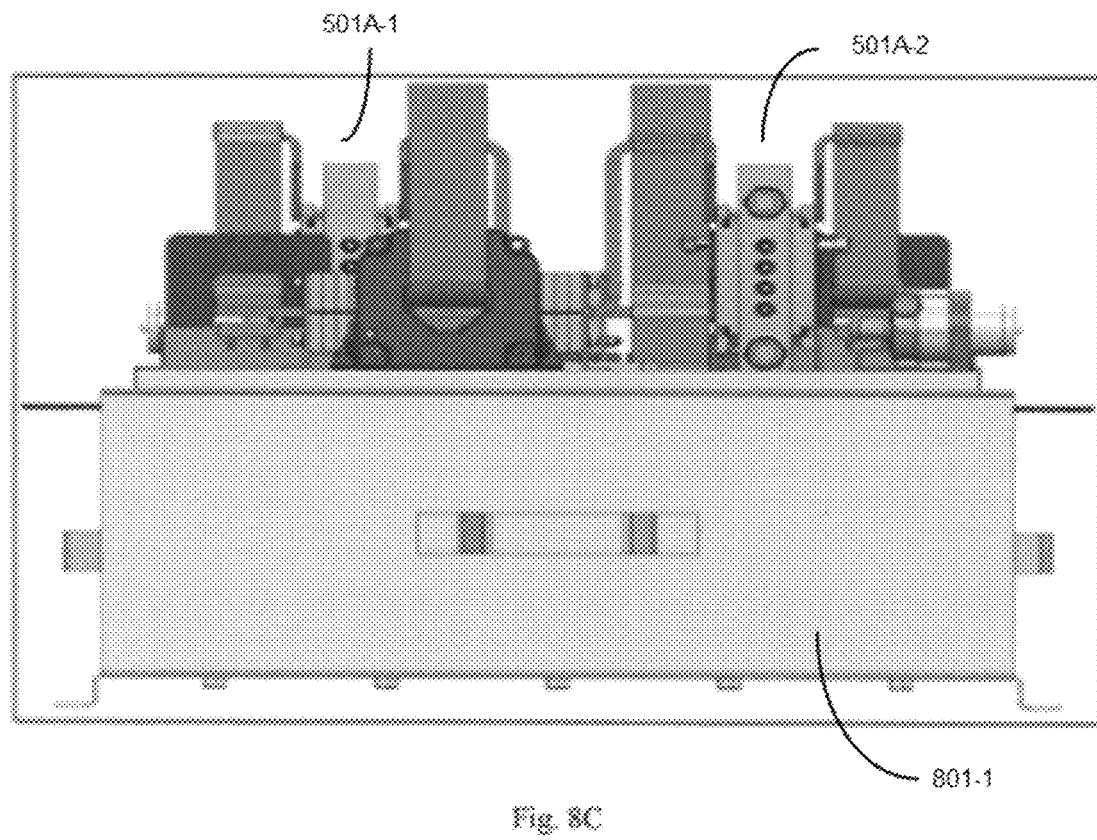
FIG. 8C is a front view diagram of FACTS based IIUs that can be disengaged and pulled out of an IIM frame on slide out rails according to one embodiment.
Figure 8D:
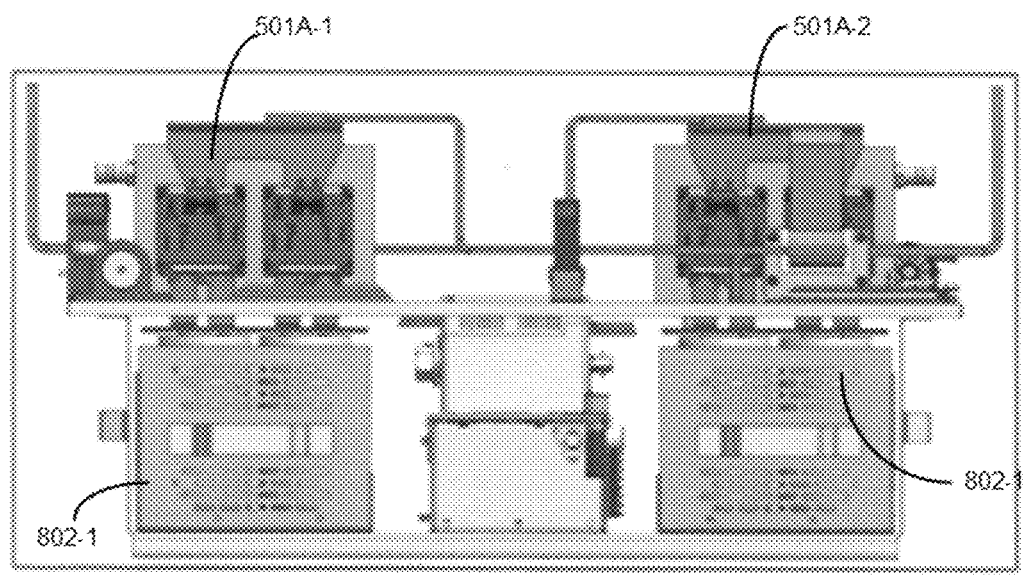
FIG. 8D is a side view diagram of a pull out module with two IIUs according to one embodiment.

FIG. 8C is a front view diagram FACTS based IIUs arranged in a pull out module 802-1 that can be disengaged and pulled out of an IIM frame on slide out rails according to one embodiment. In FIG. 8C, a pull out module 801-1 having two parallel connected FACTS based IIUs (e.g., TL-SSSC 501A-1 and 501A-2) is shown, and FIG. 8D is the side view showing the two FACTS based IIUs, such as TL-SSSCs 501A-1 and 501A-2, and their respective pull out modules 802-1 and 802-2, though FCPM 601 is not shown.

In the foregoing specification, embodiments of the disclosure have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus for injecting impedance into a high voltage (HV) transmission line of a power grid system, the apparatus comprising:
   a plurality of modular flexible alternating current transmission systems (FACTS) based impedance injection units (IIUs), each modular FACTS based IIU comprising a plurality of FACTS based switch units and a capacitor connected in parallel with the FACTS based switch units forming a transformerless static synchronous series compensator (TL-SSSC), and each modular FACTS based IIU without fault current protection; and
   a fault current protection module external to the modular FACTS based IIUs, wherein the fault current protection module is coupled to the modular FACTS based IIUs to provide fault current protection to the modular FACTS based IIUs of the apparatus.

2. The apparatus of claim 1, wherein the apparatus is attached to a segment of the HV transmission line of the grid power system.

3. The apparatus of claim 2, wherein the apparatus is configured to extract power from the segment of the HV transmission line.

4. The apparatus of claim 1, wherein
   the plurality of modular FACTS based IIUs comprises a first group of series-connected modular FACTS based IIUs and a second group of series-connected modular FACTS based IIUs interconnected in a series-parallel connection with the first group of series-connected modular FACTS based IIUs, and
   the fault current protection module is coupled in parallel with the first group of series-connected modular FACTS based IIUs and the second group of series-connected modular FACTS based IIUs.

5. The apparatus of claim 1, further comprising one or more pull out modules, each pull out module including at least two parallel-connected modular FACTS based IIUs from the plurality of modular FACTS based IIUs.

6. The apparatus of claim 5, wherein the one or more pull out modules are series-connected with one another, and each pull out module is individually disengageable or disconnectable.

7. The apparatus of claim 5, wherein the fault current protection module is disposed at top of the apparatus and the one or more pull out modules are disposed at bottom of the apparatus.

8. The apparatus of claim 1, wherein each FACTS based switch unit comprises an insulated gate bipolar transistor (IGBT) and a switch control configured to control the IGBT based on an input control signal received from a control and communication module.

9. The apparatus of claim 1, wherein the fault current protection module comprises:
  a metal oxide varistor configured to handle surges and transients,
  a current limiting inductor,
  a triggered gap connected in series with the current limiting inductor,
  a bypass switch configured to handle short circuits and ground short conditions, the bypass switching being connected in parallel with the triggered gap, and
  a recloser switch configured to isolate the plurality of modular FACTS based IIUs from the HV transmission line, the recloser switch being connected in parallel with the metal oxide varistor.

10. A power grid system, comprising:
  a plurality of impedance injection modules distributed on a power transmission line, each impedance injection module comprising:
  a plurality of modular flexible alternating current transmission systems (FACTS) based impedance injection units (IIUs), each modular FACTS based IIU comprising a plurality of FACTS based switch units and a capacitor connected in parallel with the FACTS based switch units forming a transformerless static synchronous series compensator (TL-SSSC), and each modular FACTS based IIU without fault current protection; and
  a fault current protection module external to the modular FACTS based IIUs, wherein the fault current protection module is coupled to the modular FACTS based IIUs to provide fault current protection to the modular FACTS based IIUs.

11. The power grid system of claim 10, wherein
  the plurality of modular FACTS based IIUs comprises a first group of series-connected modular FACTS based IIUs and a second group of series-connected modular FACTS based IIUs interconnected in a series-parallel connection with the first group of series-connected modular FACTS based IIUs, and
  the fault current protection module is coupled in parallel with the first group of series-connected modular FACTS based IIUs and the second group of series-connected modular FACTS based IIUs.

12. The power grid system of claim 10, wherein the plurality of FACTS based IIUs are connected in a series-parallel configuration, with the fault current protection module being connected in parallel to the plurality of FACTS based IIUs.

13. The power grid system of claim 10, wherein each impedance injection module further comprises one or more pull out modules, each pull out module including at least two parallel-connected modular FACTS based IIUs from the plurality of modular FACTS based IIUs.

14. The power grid system of claim 13, wherein the one or more pull out modules are series-connected with one another, and each pull out module is individually disengageable or disconnectable.

15. The power grid system of claim 11, wherein the fault current protection module is disposed at top of the impedance injection module and the one or more pull out modules are disposed at bottom of the impedance injection module.

16. The power grid system of claim 10, wherein each FACTS based switch unit comprises an insulated gate bipolar transistor (IGBT) and a switch control configured to control the IGBT based on an input control signal received from a control and communication module.

17. The power grid system of claim 10, wherein the fault current protection module comprises:
  a metal oxide varistor configured to handle surges and transients,
  a current limiting inductor,
  a triggered gap connected in series with the current limiting inductor,
  a bypass switch configured to handle short circuits and ground short conditions, the bypass switching being connected in parallel with the triggered gap, and
  a recloser switch configured to isolate the plurality of modular FACTS based IIUs from the HV transmission line, the recloser switch being connected in parallel with the metal oxide varistor.

18. A method of providing fault current protection to a plurality of distributed impedance injection modules (IIMs), the method comprising:
  distributing the plurality of IIMs on a high voltage (HV) transmission line, each IIM comprising a plurality of modular flexible alternating current transmission systems (FACTS) based impedance injection units (IIUs), each modular FACTS based IIU comprising a plurality of FACTS based switch units and a capacitor connected in parallel with the FACTS based switch units forming a transformerless static synchronous series compensator (TL-SSSC), the modular FACTS based IIUs without fault current protection, and connected and coupled to a segment of the high voltage transmission line for control of power flow and disturbance at a local region of the HV transmission line;
  interconnecting, the plurality of modular FACTS based IIUs without fault current protection, in each IIM in series, parallel or series-parallel configuration;
  connecting a fault current protection module in parallel with the plurality of interconnected modular FACTS based IIUs in each IIM; and
  providing fault current protection to the plurality of interconnected modular FACTS based IIUs in each IIM.

19. The method of claim 18, wherein providing the fault current protection to the plurality of interconnected modular FACTS based IIUs is by the parallel connected fault current protected module, connected in parallel with the plurality of interconnected modular FACTS based IIUs.

20. The method of claim 19, wherein the fault current protection module comprises:
  a metal oxide varistor,
  a current limiting inductor,
  a triggered gap connected in series with the current limiting inductor,
  a bypass switch connected in parallel with the triggered gap, and
  a recloser switch connected in parallel with the metal oxide varistor.

21. The method of claim 18, wherein
providing the fault current protection to the plurality of interconnected modular FACTS based IIUs comprises:
using varistors in the fault current protection module to divert transmission line current away from the plurality of interconnected modular FACTS based IIUs; or
using electromechanical contactors and vacuum interrupters to shut off short circuit current.

* * * * *

UNITED STATES PATENT AND TRADEMARK OFFICE
CERTIFICATE OF CORRECTION

PATENT NO. : 11,641,102 B2
APPLICATION NO. : 17/176979
DATED : May 2, 2023
INVENTOR(S) : Haroon Inam et al.

It is certified that error appears in the above-identified patent and that said Letters Patent is hereby corrected as shown below:

On the Title Page

Item (60), Related U.S. Application Data, delete "62/987,515" and insert --62/987,815--.

Signed and Sealed this
Fourth Day of June, 2024

Katherine Kelly Vidal
*Director of the United States Patent and Trademark Office*